US008756057B2

(12) United States Patent
Miller et al.

(10) Patent No.: US 8,756,057 B2
(45) Date of Patent: Jun. 17, 2014

(54) SYSTEM AND METHOD USING FEEDBACK SPEECH ANALYSIS FOR IMPROVING SPEAKING ABILITY

(75) Inventors: Steven Michael Miller, Cary, NC (US); Anne R. Sand, Peyton, CO (US)

(73) Assignee: Nuance Communications, Inc., Burlington, MA (US)

(*) Notice: Subject to any disclaimer, the term of this patent is extended or adjusted under 35 U.S.C. 154(b) by 965 days.

(21) Appl. No.: 11/265,591

(22) Filed: Nov. 2, 2005

(65) Prior Publication Data

US 2007/0100626 A1  May 3, 2007

(51) Int. Cl.
*G10L 15/26* (2006.01)
*G10L 17/00* (2013.01)
*G10L 11/00* (2006.01)
*G10L 21/00* (2013.01)

(52) U.S. Cl.
USPC ........ 704/235; 704/246; 704/270; 704/270.1; 704/275; 704/276; 704/278

(58) Field of Classification Search
USPC .............. 704/270, 271, 235, 277, 270.1, 275, 704/273, 9, 246, 276, 278; 434/185, 186, 434/187, 169
See application file for complete search history.

(56) References Cited

U.S. PATENT DOCUMENTS

| | | | |
|---|---|---|---|
| 5,566,291 A * | 10/1996 | Boulton et al. .............. 715/709 |
| 5,613,032 A * | 3/1997 | Cruz et al. ................... 386/241 |
| 5,634,086 A | 5/1997 | Rtischev et al. |
| 5,794,203 A | 8/1998 | Kehoe |
| 6,064,961 A * | 5/2000 | Hanson ......................... 704/260 |
| 6,115,482 A * | 9/2000 | Sears et al. ................... 382/114 |
| 6,272,461 B1 * | 8/2001 | Meredith et al. ............. 704/235 |
| 6,324,511 B1 * | 11/2001 | Kiraly et al. ................. 704/260 |
| 6,397,185 B1 * | 5/2002 | Komissarchik et al. ...... 704/270 |
| 6,468,084 B1 * | 10/2002 | MacMillan ................... 434/185 |
| 6,568,939 B1 * | 5/2003 | Edgar ............................ 434/179 |
| 6,624,826 B1 * | 9/2003 | Balabanovic ................. 715/727 |
| 6,644,973 B2 * | 11/2003 | Oster ............................ 434/178 |
| 6,728,680 B1 * | 4/2004 | Aaron et al. .................. 704/271 |
| 6,810,146 B2 * | 10/2004 | Loui et al. .................... 382/173 |
| 6,931,587 B1 * | 8/2005 | Krause .......................... 715/205 |
| 7,181,692 B2 * | 2/2007 | Siegel ............................ 715/727 |
| 7,191,133 B1 * | 3/2007 | Pettay .......................... 704/270 |
| 7,433,819 B2 * | 10/2008 | Adams et al. ................. 704/251 |
| 7,493,559 B1 * | 2/2009 | Wolff et al. ................... 715/727 |
| 7,664,641 B1 * | 2/2010 | Pettay et al. .................. 704/251 |
| 7,729,478 B1 * | 6/2010 | Coughlan et al. .......... 379/88.04 |
| 7,873,520 B2 * | 1/2011 | Paik .............................. 704/258 |
| 2002/0130891 A1 * | 9/2002 | Singer .......................... 345/684 |
| 2003/0013073 A1 * | 1/2003 | Duncan et al. ............... 434/317 |
| 2003/0033288 A1 * | 2/2003 | Shanahan et al. ................ 707/3 |
| 2003/0202007 A1 | 10/2003 | Silverstein et al. |
| 2004/0067472 A1 * | 4/2004 | Polanyi et al. ............... 434/178 |
| 2004/0138894 A1 * | 7/2004 | Kiecza et al. ................ 704/277 |
| 2005/0119894 A1 * | 6/2005 | Cutler et al. ................. 704/270 |
| 2005/0137872 A1 * | 6/2005 | Brady .......................... 704/269 |
| 2006/0100877 A1 * | 5/2006 | Zhang et al. ................. 704/260 |
| 2007/0150801 A1 * | 6/2007 | Chidlovskii et al. ......... 715/512 |
| 2010/0023319 A1 * | 1/2010 | Bikel et al. ....................... 704/9 |

* cited by examiner

*Primary Examiner* — Edgar Guerra-Erazo
(74) *Attorney, Agent, or Firm* — Wolf, Greenfield & Sacks, P.C.

(57) ABSTRACT

A speech analysis system and method for analyzing speech. The system includes: a voice recognition system for converting inputted speech to text; an analytics system for generating feedback information by analyzing the inputted speech and text; and a feedback system for outputting the feedback information.

29 Claims, 4 Drawing Sheets

FIG. 4

SYSTEM AND METHOD USING FEEDBACK SPEECH ANALYSIS FOR IMPROVING SPEAKING ABILITY

BACKGROUND OF THE INVENTION

1. Technical Field

The present invention relates generally to speech analysis, and more specifically relates to a system and method for utilizing voice recognition and speech analytics to analyze and evaluate a speech.

2. Related Art

The ability to effectively communicate information using speech remains a challenge for many individuals. Common problems include adding utterances like "umm" into their sentences, speaking too fast or too slow, speaking at the wrong complexity level for the audience, etc. As more work is done remotely, e.g., via conference calls, on-line broadcasts, etc., the ability to effectively speak becomes even more important as visual body language cues are removed from the communication process. Instead, listeners must concentrate their focus on the speaker's voice, grammar, and audible style.

Current methods of teaching public speaking, teaching proper speaking or improving speech problems require humans to detect problems and provide all of the feedback. This training is often done in person and the speech is often not recorded or analyzed specifically to review later. Even if it is recorded or notes are taken, feedback must be obtained through a manual process, and the feedback is not typically linked directly with different portions of a speech. Real-time analysis is even more difficult to provide, as feedback is not available without interrupting the speaker.

Accordingly, a need exists for a speech analysis system that can provide automated feedback about a verbal communication being made by a speaker.

SUMMARY OF THE INVENTION

The present invention addresses the above-mentioned problems, as well as others, by providing a system and method for improving speech by using voice recognition and speech analytics to analyze speech and provide feedback. During a speech or verbal communication, a voice recognition system first converts the speaker's voice into text. This text is then analyzed and annotated with feedback information. For example, words, phrases, sentences or paragraphs could be annotated with data that indicates the volume, speed and pitch of speech during a timeframe. The feedback could be provided in real-time, or saved for later review. The invention may also include instructional materials as well as a collaborative environment for coaching and peer-to-peer learning.

In a first aspect, the invention provides a speech analysis system for analyzing speech, comprising: a voice recognition system for converting inputted speech to text; an analytics system for generating feedback information by analyzing the inputted speech and text; and a feedback system for outputting the feedback information.

In a second aspect, the invention provides a computer program product stored on a computer usable medium for analyzing speech, comprising: program code configured for converting inputted speech to text; program code configured for generating feedback information by analyzing the inputted speech and text; and program code configured for outputting the feedback information.

In a third aspect, the invention provides a method for analyzing speech, comprising: converting inputted speech to text; capturing timing related information and volume information from the speech; analyzing the text to generate textual information; generating annotations for the text; generating feedback information based on the capturing, analyzing, and generating steps; and outputting the feedback information.

In a fourth aspect, the invention provides a method for deploying a speech analysis application, comprising: providing a computer infrastructure being operable to: convert inputted speech to text; generate feedback information by analyzing the inputted speech and text; and output the feedback information.

In a fifth aspect, the invention provides computer software embodied in a propagated signal for implementing a speech analysis system, the computer software comprising instructions to cause a computer to perform the following functions: convert inputted speech to text; generate feedback information by analyzing the inputted speech and text; and output the feedback information.

BRIEF DESCRIPTION OF THE DRAWINGS

These and other features of this invention will be more readily understood from the following detailed description of the various aspects of the invention taken in conjunction with the accompanying drawings in which:

FIG. 4 depicts a textual interface in accordance with the present invention.

DETAILED DESCRIPTION OF THE INVENTION

Figure 1:
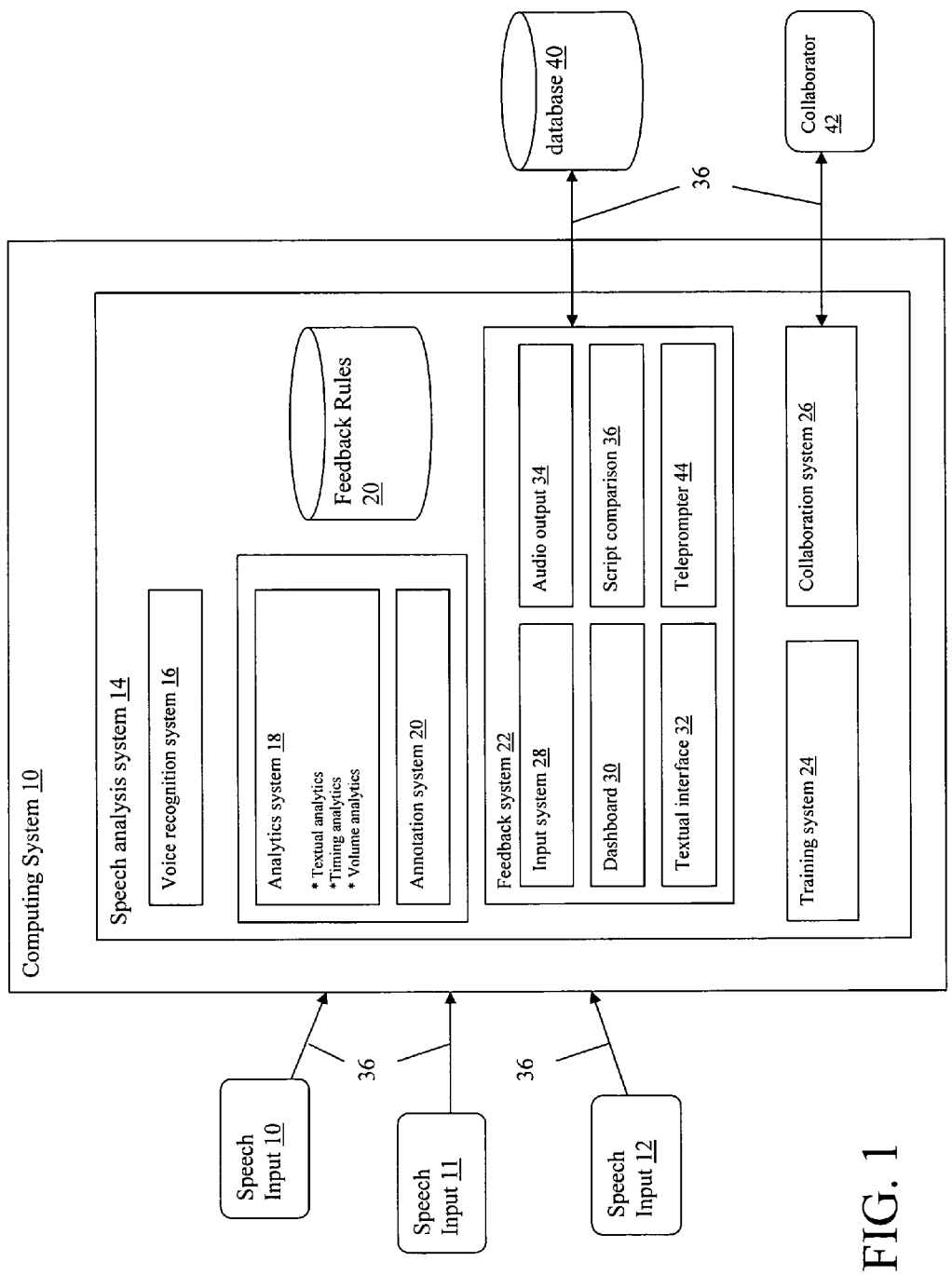
FIG. 1 depicts a computing system having a speech analysis system in accordance with the present invention.

Referring now to drawings, FIG. 1 depicts a computing system 10 that includes a speech analysis system 14 for analyzing speech inputs 10, 11, 12 of one or more speakers. Speech analysis system 14 may be implemented to analyze the speech input: (1) of a single user, e.g., speaking into a microphone at a client computer, or (2) of multiple users, e.g., speaking into a microphone during a conference call. Furthermore, it understood that the term "speech" as used herein may refer to any form of verbal communication, including free form speech, scripted speech, conversation, etc. Moreover, it should be understood that computing system 10 may be implemented in a standalone fashion, e.g., as software on a personal computer, or in a distributed fashion, e.g., distributed within a computer or telephony network.

Speech analysis system 14 includes: (1) a voice recognition system 16 that converts spoken words into text; (2) an analytics system 18 that analyzes the textual content, speed, volume, timing, etc., of speech input and text, which can be used as feedback for the user; (3) an annotation system 20 that further transforms the analysis into annotations that can also be used as feedback to the user; and (4) a feedback system 22 that provides feedback information to the end user(s) about the speech input(s) 10, 11, 12. Also included is a training system 24 that provides tutorials, canned speeches, etc., for training a speaker, and a collaboration system 26 that allows a third party collaborator 42 to further analyze the speech input and provide feedback.

Voice recognition system 16 may be implemented using any now known or later developed voice recognition technology. Such technologies are well understood in the art, and are therefore not discussed in further detail. Analytics system 18 can likewise use any now known or later developed technology. For instance, analytics system 18 may utilize a textual analytics system that analyzes textual words to mine information and identify characteristics contained in the text, e.g., the use of improper words such as "um," "uh," "like," etc.; the complexity level of the content, e.g., PhD, technician, grade school, etc.; and the use of improper grammar, the repeated use of words or phases, politically incorrect statements, etc. Analytics system 18 may also analyze the volume, intonation, speed, pitch, and articulation of the speech input. For instance, mumbling, stuttering, pauses, nervousness, etc., may all be identified by analytics system 18. Results from the analysis can then be utilized by feedback system 22 to provide feedback to the user.

Annotation system 20 further transforms the analysis information provided by analytics system 18 into annotations that can also be utilized by feedback system 22 to provide feedback to the user. Annotations generally comprise metadata associated with a portion of the speech. For instance, if a word is mumbled, a metadata tag indicating a mumbled word may be attached or associated with the mumbled word. Similarly, if the speaker pauses, a metadata tag containing the length of the pause can be associated with that point within the speech. The type of analytics, annotations and feedback provided by speech analysis system 14 are determined by a set of feedback rules 20. Feedback rules 20 can be stored, managed and implemented in any manner.

Feedback system 22 provides one or mechanisms for providing feedback to the user about the inputted speech. In this illustrative embodiment, feedback system 22 includes an input system 28 for handling both real time and recorded inputs; a speech analysis dashboard 30 for displaying feedback about the speech input; a textual interface 32 for displaying the speech input in a text form with annotations; an audio output 34 for playing back the speech in conjunction with the speech analysis dashboard 30 or textual interface 32; a script comparison system for comparing a speech script with speech input 10, 11, 12; and a teleprompter 44. As noted, feedback information may be displayed/outputted to the user in a real time fashion as the user speech is inputted into the speech analysis system 14. Alternatively, speech information, including recorded speech, text, and/or feedback information may be saved and recorded in a database 40 for later playback. Depending on the desired feedback, the mechanisms provided by feedback system 22 may be combined together or utilized separately. For instance, the speech analysis dashboard 30 may be combined with the textual interface 32.

As noted, a training system 24 may be provided to teach and train speakers. The training system 24 could be used individually by the user, e.g., in a self-paced manner. It could provide tutorials, drills, suggested topics, feedback and coaching. For instance, training system 24 may include drills in which the user recites a script to teach users to strategically use pauses to emphasize points, to vary pitch, to utilize words to slow down or speed up the speech, etc. Training system 24 may also include features that allow one or more collaborators 42 to review and comment on the speech via a collaboration system 26. Collaboration system 26 would allow collaborators to add additional annotations or comments to the speech. This could be done remotely over a network 36, such as the Internet. This would thus allow a collaborative peer-to-peer learning environment.

Figure 2:
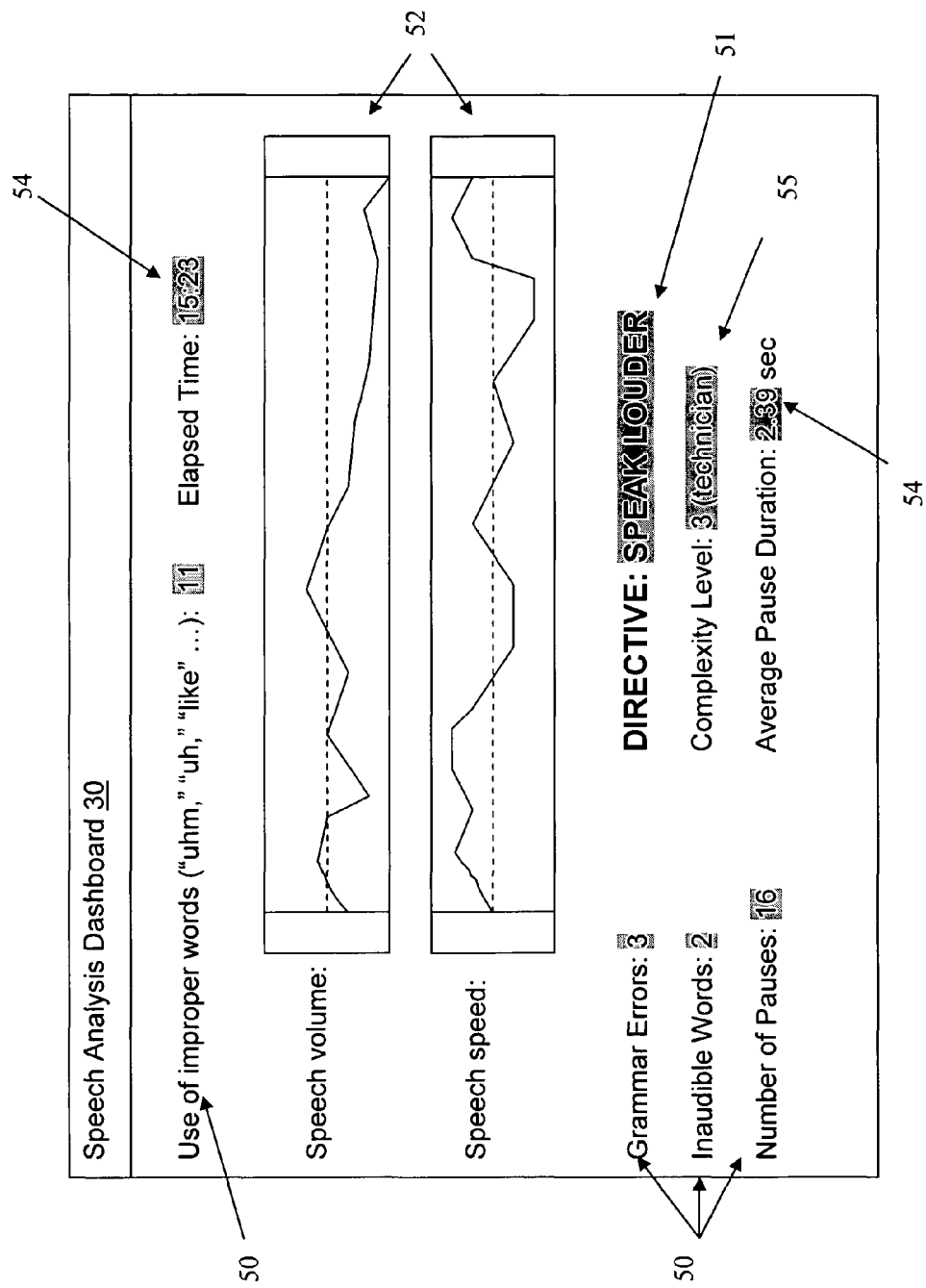
FIG. 2 depicts a speech analysis feedback system in the form of a dashboard in accordance with the present invention.

Referring now to FIG. 2, an illustrative speech analysis dashboard 30 is shown. The feedback information in the dashboard 30 could for instance be displayed in a window on a computer screen, on a hand held device display, in a browser window, etc. Included in speech analysis dashboard 30 are various outputs captured by speech analysis system 14 for an inputted speech. In this example, dashboard 30 includes various counters 50 that count the use of improper words, grammar errors, inaudible words, and pauses. In addition, dashboard 30 may include visual outputs 52 that graphically track characteristics such as volume and speed. Also included is timing information 54 that displays elapsed time for the speech and average pause duration. Additional textual analytics based information, such as complexity level 55, may be shown. In this case, based on a textual analytics process, it was determined that the complexity level of the speech is that of a level 3 technician. Obviously, the amount, type, and arrangement of feedback information on the dashboard could vary without departing from the scope of the invention.

Speech analysis dashboard 30 could thus provide real time analysis and feedback for use during an actual presentation. Namely, the speaker could look at the feedback information being provided and adjust their speaking as needed during the presentation. Moreover, speech analysis dashboard 30 could include one or more directives 51, such as SPEAK LOUDER.

In a further embodiment, feedback system 22 may be implemented as a teleprompter 44 that feeds back real time directives to the speaker along with the speech text. Thus, during a speech, the speaker could examine the teleprompter from time to time for directives to refine the speech, e.g., slow down, speak louder, reduce using the term "umm," 60 seconds remaining, etc.

Figure 3:
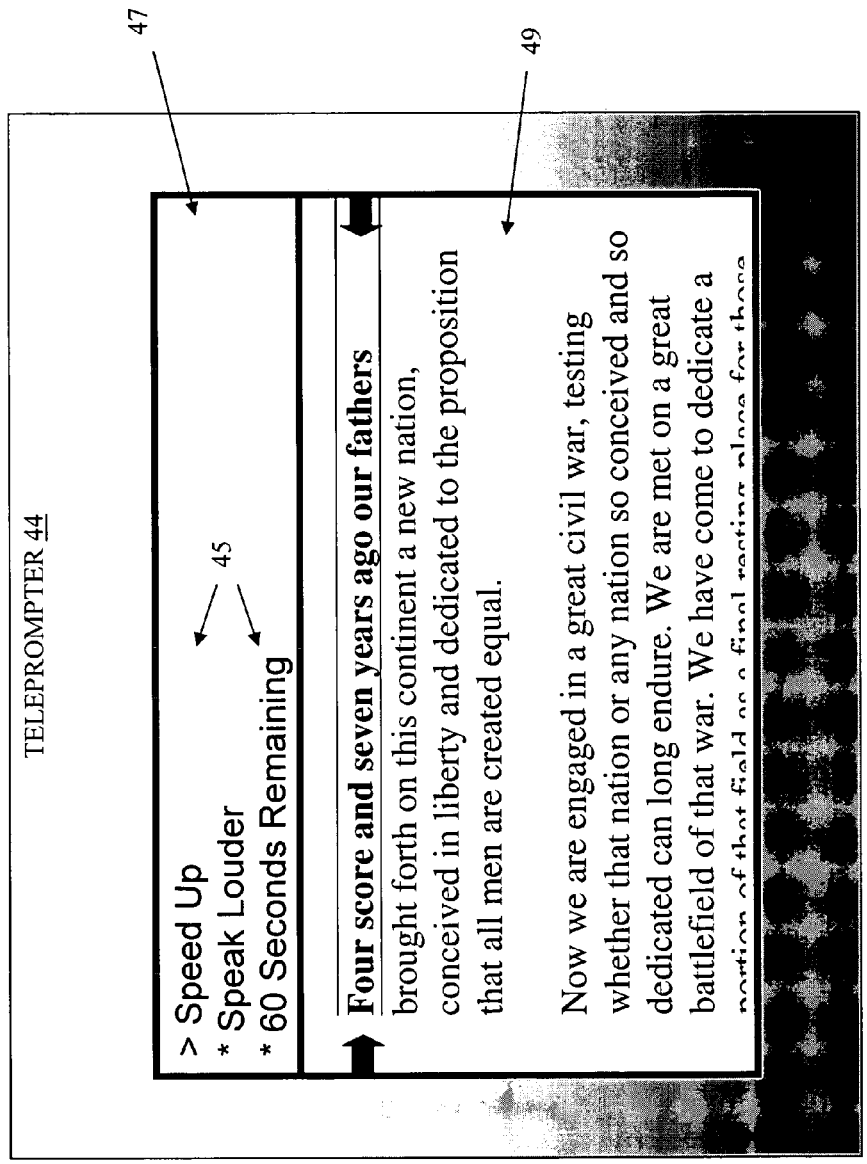
FIG. 3 depicts a speech analysis feedback system in the form of a teleprompter in accordance with the present invention.

FIG. 3 depicts an illustrative embodiment of a teleprompter 44 that tracks the text of the speech in a text window 49 and sequentially displays feedback directives 45 in a directives window 47. As can be seen, the text window 49 displays the speech in a scrolling manner in which the current text line is highlighted by arrows. The directives window 47 displays a current directive, "speed up," along with previous directives. In this embodiment, each time a new directive appears in the directives window 47, the previous directives are queued downward. This allows the speaker to not only view the current directive, but also any recent directives. Obviously, the specific layout format and content shown on the teleprompter 44 could change without departing from the scope of the invention. Moreover, in an alternative approach, teleprompter 44 could be displayed with additional statistical information, such as that shown above in speech analysis dashboard 30.

Figure 4:
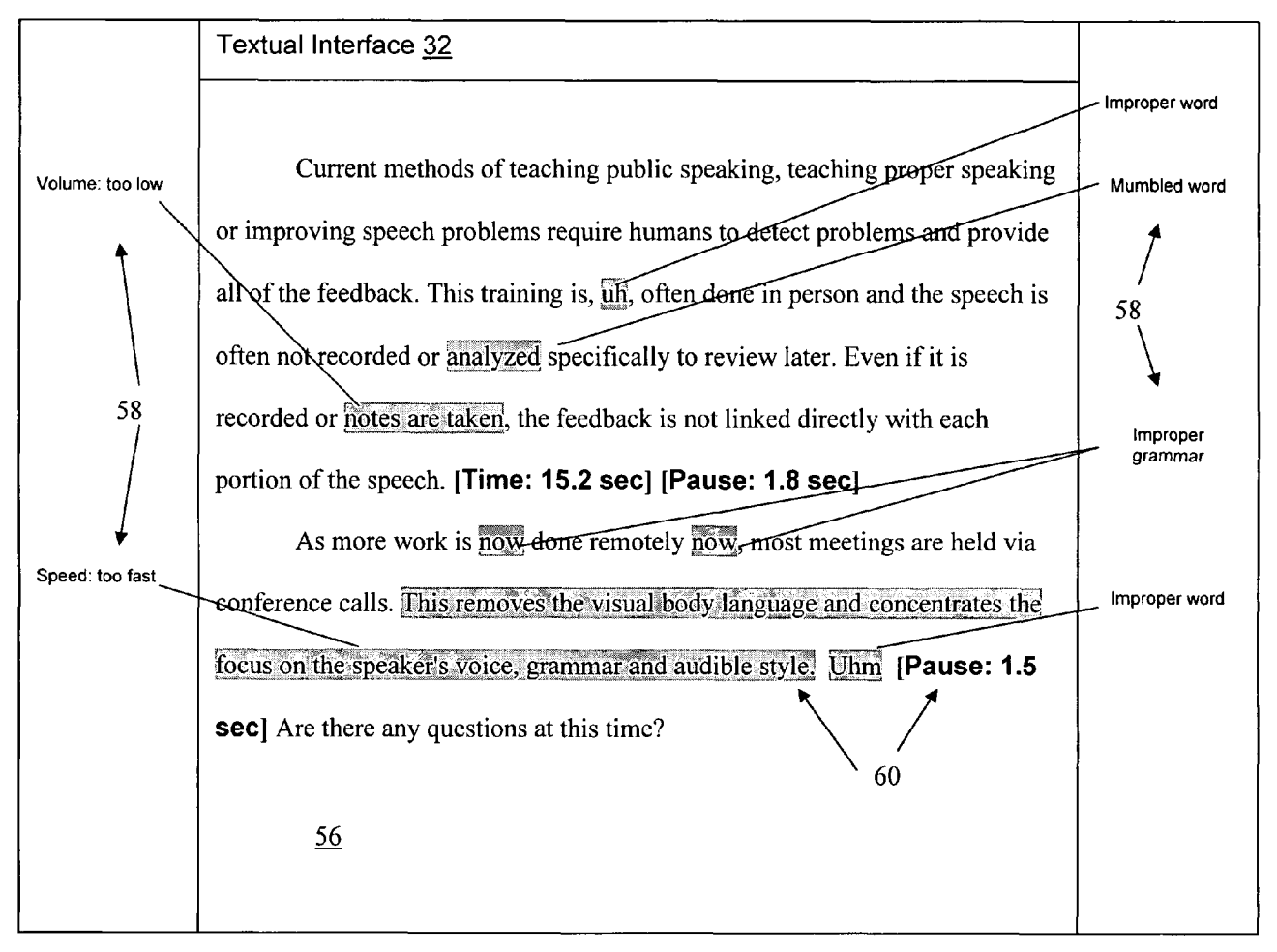

FIG. 4 depicts an illustrative textual interface 32 that can also be displayed by feedback system 22. The feedback information in the textual interface 32 could likewise be displayed in a window on a computer screen, on a hand held device display, in a browser window, etc. In this case, the text of the inputted speech is displayed in a text window 56, along with annotations 58, 60. In the example shown, some of the annotations 58 are shown apart from the text window 56 and annotate words or phrases contained in the text window 56. Examples shown refer to text where the volume is too low, the speed is too fast, an improper word is used, a word was mumbled, improper grammar was used, etc. Other annotations 60 appear in the text window 56 itself. Examples include highlighted words, timing information, etc. Obviously, the particular arrangement of the textual interface 32 could vary without departing from the scope of the invention.

In general, computing system 10 may comprise any type of computing device or system of devices. Computing system 10 could be implemented as part of a client and/or a server, where e.g., portions of the speech analysis system 14 reside on a server and other portions reside on a client. Computing system 10 generally includes a processor, input/output (I/O), memory, and bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing system 10 and likewise may comprise any known type of transmission link, including electrical, optical, wireless, etc. Although not shown, additional components, such as cache memory, communication systems, system software, etc., may be incorporated into computing system 10.

Access to computing system may be provided over a network 36 such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computing system 10 comprising speech analysis system 30 could be created, maintained and/or deployed by a service provider that offers the functions described herein for customers. That is, a service provider could offer to provide speech analysis and training in an on-line environment as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A speech analysis system for analyzing speech, comprising:
   at least one hardware processor that:
   converts inputted speech received from a speaker to text;
   displays the text in a textual interface displayed on at least one display device;
   automatically generates feedback information, that comprises results of an analysis of the inputted speech and/or text, by automatically analyzing the inputted speech and/or text; and
   automatically outputs the feedback information as annotations in the textual interface, wherein the annotations are distinct from the inputted speech and text.

2. The speech analysis system of claim 1, wherein the at least one hardware processor generates feedback information, in part, by analyzing the text and determining a complexity level.

3. The speech analysis system of claim 1, wherein the at least one hardware processor generates feedback information, in part by capturing timing related information about the inputted speech.

4. The speech analysis system of claim 1, wherein the at least one hardware processor generates feedback information, in part, by capturing volume data for the inputted speech.

5. The speech analysis system of claim 1, wherein the at least one hardware processor generates feedback information, in part, by detecting the use of speech elements selected from the group consisting of: improper words, improper grammar, stutter, mumbling, and nervousness.

6. The speech analysis system of claim 1, wherein the annotations include data that appears in a text window containing the textual information and data that appears in a second window adjacent the text window.

7. The speech analysis system of claim 1, wherein the at least one hardware processor displays, on the at least one display device, feedback information in real time as inputted speech is received.

8. The speech analysis system of claim 1, wherein the at least one hardware processor displays, on the at least one display device, feedback information based on a previously inputted speech.

9. The speech analysis system of claim 1, wherein the at least one hardware processor displays feedback in a display on the at least one display device, the display selected from the group consisting of: a dashboard and a teleprompter.

10. The speech analysis system of claim 1, wherein the at least one hardware processor highlights words having associated annotations.

11. The speech analysis system of claim 1, further comprising a training system that provides a set of drills that can be used to improve speaking capabilities.

12. The speech analysis system of claim 1, further comprising a collaboration system that allows a third party collaborator to include additional feedback information in the textual interface.

13. A computer program product stored on a non-transitory tangible computer usable medium for analyzing speech, comprising:
program code that when executed by a processor:
converts inputted speech received from a speaker to text;
displays the text in a textual interface;
automatically generates feedback information, that comprises results of an analysis of the inputted speech and/or text, by automatically analyzing the inputted speech and/or text; and
automatically outputs the feedback information as annotations in the textual interface, wherein the annotations are distinct from the inputted speech and text.

14. The computer program product of claim 13, wherein generating feedback information includes capabilities selected from the group consisting of: textual analytics, capturing timing related information about the inputted speech, and capturing volume data for the inputted speech.

15. The computer program product of claim 13, wherein generating feedback information further comprises detecting the use speech of elements selected from the group consisting of: improper words, improper grammar, stutter, mumbling, and nervousness.

16. The computer program product of claim 13, wherein the annotations are displayed in a text window and a second window adjacent the text window.

17. The computer program product of claim 13, wherein the feedback information is displayed in real time as inputted speech is received.

18. The computer program product of claim 13, wherein the feedback information is displayed based on a previously inputted speech.

19. The computer program product of claim 13, wherein the feedback information is displayed within a display selected from the group consisting of: a dashboard and a teleprompter.

20. The computer program product of claim 13, wherein the feedback information is displayed in the textual interface that displays highlighted text along with annotations.

21. The computer program product of claim 13, further comprising training means that provides a set of drills that can be used to improve speaking capabilities.

22. The computer program product of claim 13, further comprising collaboration means that allows a third party collaborator to input additional feedback information.

23. A method for analyzing speech, comprising:
converting inputted speech received from a speaker to text and displaying the text in a textual interface;
capturing timing related information and volume information from the speech;
analyzing the text to generate textual information;
automatically generating annotations for the text that comprise results of an analysis of the speech and/or the text and displaying the annotations in the textual interface, wherein the annotations are distinct from the inputted speech and text;
generating feedback information based on the capturing, analyzing, and generating steps; and
outputting the feedback information.

24. The method of claim 23, wherein the analyzing step detects the use of speech elements selected from the group consisting of: improper words, improper grammar, stutter, mumbling, and nervousness.

25. The method of claim 23, wherein the feedback information is displayed in real time as inputted speech is received.

26. The method of claim 23, wherein the feedback information is displayed based on a previously inputted speech.

27. The method of claim 23, wherein the feedback information is outputted to a display selected from the group consisting of: a dashboard and a teleprompter.

28. The method of claim 23, wherein the textual interface that displays annotations in a text window and in a second window adjacent the text window.

29. A method for deploying a speech analysis application, comprising:
providing a computer infrastructure being operable to:
convert inputted speech received from a speaker to text;
display the text in a textual interface;
automatically generate feedback information, that comprises an analysis of the inputted speech and/or the text, by automatically analyzing the inputted speech and/or text; and
automatically output the feedback information as annotations in the textual interface, wherein the annotations are distinct from the inputted speech and text.

* * * * *